United States Patent [19]

Sugio et al.

[11] Patent Number: 4,686,131
[45] Date of Patent: Aug. 11, 1987

[54] SILYLATED POLYPHENYLENE ETHER MEMBRANE FOR GAS SEPARATION

[75] Inventors: Akitoshi Sugio, Saitama; Masao Okabe, Chiba; Masamichi Mizukami; Yoshihiko Sekine, both of Tokyo, all of Japan

[73] Assignee: Mitsubishi Gas Chemical Company, Inc., Tokyo, Japan

[21] Appl. No.: 721,966

[22] Filed: Apr. 11, 1985

[30] Foreign Application Priority Data

Apr. 11, 1984 [JP] Japan .................................. 59-72107

[51] Int. Cl.$^4$ ...................... C08G 65/48; B01D 53/22
[52] U.S. Cl. ........................................ 428/158; 55/158; 428/159; 428/411.1; 428/447; 525/390; 525/393; 525/534
[58] Field of Search ...................... 525/390, 393, 534; 428/158, 159, 411.1, 447

[56] References Cited

U.S. PATENT DOCUMENTS

| | | | |
|---|---|---|---|
| 3,402,143 | 9/1968 | Hay | 525/393 |
| 3,417,053 | 12/1968 | Chalk | 525/393 |
| 3,668,273 | 6/1972 | Krantz | 525/393 |
| 4,551,156 | 11/1985 | Li | 525/393 |

*Primary Examiner*—Harold D. Anderson
*Attorney, Agent, or Firm*—Sughrue, Mion, Zinn, Macpeak & Seas

[57] ABSTRACT

A membrane for gas separation which comprises a silylated polyphenylene ether is disclosed. Said silylated polyphenylene ether contains a constituting unit containing an organosilane or siloxane group represented by the following formula in at least a part of the repeating unit thereof:

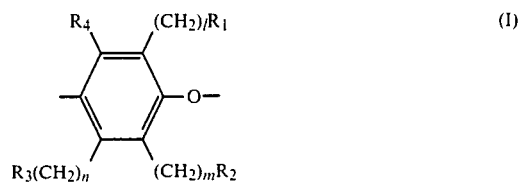

(I)

wherein $R_1$, $R_2$, $R_3$ and $R_4$ each represents a hydrogen atom or a group of the formula $-Si(R_5)(R_6)(R_7)$, wherein $R_5$, $R_6$ and $R_7$ each represents an alkyl group; l and n each represents 0 or an integer from 1 to 3; and m represent an integer of from 1 to 3; with the proviso that $R_1$, $R_2$, $R_3$ and $R_4$ do not simultaneously represent hydrogen atoms.

13 Claims, No Drawings

SILYLATED POLYPHENYLENE ETHER MEMBRANE FOR GAS SEPARATION

FIELD OF THE INVENTION

This invention relates to a membrane for separation of gas, particularly oxygen, which comprises a silylated polyphenylene ether containing an organosilyl group in at least a part of the repeating unit thereof.

BACKGROUND OF THE INVENTION

Method of separation of materials by the use of a membrane have been noted from the standpoint of saving resources and energy. Separation by membrane is applicable to a variety of materials including gases, such as oxygen and hydrogen. In separation of a mixed gas, if a specific gas in the mixed gas may be concentrated, various advantages are attained according to the kind of the gas.

Taking oxygen for an instance, it is said that use of an oxygen-rich air for combustion boilers will save 10% or more of a fuel. Further, medical use of an oxygen-rich air secures safety against accidental oxygen poisoning as encountered in the use of pure oxygen.

Materials which can be used for a membrane for separating oxygen are required to have (1) a great oxygen permeability coefficient, (2) high selectivity to oxygen permeation, (3) capability of forming a thin film, and the like. However, none of known materials satisfies both of the requirements (1) and (2) above at the same time. Therefore, in selecting materials for the membrane, it is general practice to consider predominantly either one of the above requirements (1) and (2) over another according to the end use of the membrane.

Materials that are superior in terms of oxygen permeability coefficient broadly include polycarbonate/polyorganosiloxane copolymers, poly-4-methylpentene-1, fluorine-containing polymer/polyorganosiloxane graft copolymers, phenol- or phenol ether-added polymer/α,ω-difunctional polysiloxane block copolymers, and the like. Polyphenylene ether is already known as an example of these materials.

Since the polyphenylene ether does not have a sufficient oxygen permeability coefficient, several attempts have been so far made in order to increase the oxygen permeability coefficient of the polyphenylene ether. For example, conventional techniques include a method for introducing a 2-allyl-6-methylphenylene ether unit or a 2,6-diallylphenylene ether unit into at least a part of the repeating unit as disclosed in Japanese Patent Application (OPI) No. 55008/83 (the term "OPI" as herein used means "unexamined published application") and a method for blending a polyphenylene ether and a polyorganosiloxane as disclosed in Japanese Patent Application (OPI) No. 95538/83. However, these known methods are still unsatisfactory. In particular, the latter method involves a disadvantage of poor compatibility between a polyphenylene ether and a polyorganosiloxane.

SUMMARY OF THE INVENTION

As a result of extensive investigations to increase an oxygen permeability coefficient of a polyphenylene ether, it has now been found that introduction of an organosilyl group in a molecular chain of a polyphenylene ether markedly improves the oxygen permeability and eliminates the disadvantage entailed by poor compatibility.

Accordingly, this invention relates to a membrane for gas separation comprising a silylated polyphenylene ether having a constituting unit containing an organosilane group as represented by the formula (I):

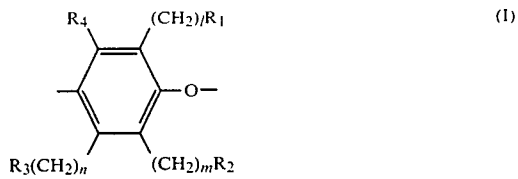

wherein $R_1$, $R_2$, $R_3$ and $R_4$ each represents a hydrogen atom or a group of the formula $-Si(R_5)(R_6)(R_7)$, wherein $R_5$, $R_6$ and $R_7$ each represents an alkyl group having 1 to 5, preferably 1 to 2, carbon atoms; l and n each represents 0 or an integer of from 1 to 3; and m represents an integer of from 1 to 3; with the proviso that $R_1$, $R_2$, $R_3$ and $R_4$ do not simultaneously represent hydrogen atoms.

In a preferred embodiment, the present invention relates to a membrane for gas separation comprising a porous thin support having coated thereon the silylated polyphenylene ether.

DETAILED DESCRIPTION OF THE INVENTION

The silylated polyphenylene ether containing a constituting unit represented by the formula (I) in at least a part of the repeating unit thereof can be prepared by silylation of a conventionally known polyphenylene ether.

The polyphenylene ether which can be used in the present invention is the one obtained by polycondensation of at least one of monofunctional phenols substituted with a lower alkyl group having 1 to 3 carbon atoms at the 2-position thereof and unsubstituted or substituted with a lower alkyl group having 1 to 3 carbon atoms at the 3- and/or 6-positions thereof, such as 2,6-dimethylphenol, 2,6-diethylphenol, 2,6-dipropylphenol, 2-methyl-6-ethylphenol, 2-methyl-6-propylphenol, 2-ethyl-6-propylphenol, o-cresol, 2,3-dimethylphenol, 2,3-diethylphenol, 2,3-dipropylphenol, 2-methyl-3-ethylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, 2,6-dimethyl-3-propylphenol, and the like. Specific examples of preferred polyphenylene ethers are poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly (2-ethyl-6-propyl-1,4-phenylene) ether, 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer, 2,6-dipropylphenol/2,3,6-trimethylphenol copolymer, and the like. Of these, poly(2,6-dimethyl-1,4-phenylene) ether and 2,6-dimethylphenol/2,3,6-trimethylphenol copolymer, are 2,6-trimethylphenol copolymer are particularly preferred.

Silylation of these polyphenylene ethers can be carried out in a known manner. For example, a polyphenylene ether is reacted with an alkali metal-adding agent, such as an alkyl alkali metal, an aryl alkali metal, etc., usually in the presence of a thoroughly dried solvent to form an alkali metal-added polyphenylene ether, which is then reacted with a monohalogenated silane, as described, e.g., in U.S. Pat. No. 3,402,144.

The alkyl or aryl group in the alkyl or aryl alkali metal which can be used in the alkali metal addition reaction may be arbitrarily selected since it does not constitute the polyphenylene ether. The alkali metal in the alkyl or aryl alkali metal includes lithium, potassium, rubidium, cesium, etc. Of these, an alkyl lithium or an aryl lithium is preferred in view of workability.

The amount of the alkyl or aryl alkali metal to be used may appropriately be selected depending on the desired amount of a silyl group to be introduced per repeating unit of the polyphenylene ether. Usually, it is in the range of from 0.3 to 3.0 molar equivalents, and preferably from 0.5 to 2.0 molar equivalents, per repeating unit.

The solvents to be used are those which are substantially inactive to the alkyl or aryl alkali metal and are capable of dissolving polyphenylene ethers, and specifically include benzene, toluene, xylene, tetrahydrofuran, and the like.

The reaction is carried out at a temperature of from about $-80°$ to about $80°$ C., preferably from $-50°$ to $30°$ C.

In the above reaction, an alkali metal is added to the phenylene nucleus of the polyphenylene ether at the unsubstituted position thereof or the $\alpha$-carbon atom of the alkyl substituent thereof. The proportion of the addition to the phenylene nucleus to the addition to the $\alpha$-carbon atom varies with reaction temperature. The lower the reaction temperature, the greater the proportion of the addition to the phenylene nucleus. Addition of a silyl group directly to the phenylene nucleus brings better results in terms of increase of an oxygen permeability coefficient. Therefore, the reaction temperature is preferably selected in the range of from $-50°$ C. to $0°$ C.

The thus obtained alkali metal-added polyphenlene ether is reacted with a silylating agent to produce a silylated polyphenylene ether according to the present invention.

Since the alkali metal-added polyphenylene ether exhibits very high reactivity, silylation is preferably effected by adding a silylating agent directly to the reaction mixture containing the alkali metal-added polyphenylene ether as is produced above without being isolated.

The silylating agent which can be used for silylation is a compound represented by the formula:

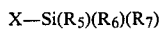

$$X-Si(R_5)(R_6)(R_7)$$

wherein $R_5$, $R_6$ and $R_7$ are as defined above; and X represents a halogen atom.

The alkyl group for $R_5$ to $R_7$ preferably contains from 1 to 5 carbon atoms, and the halogen atom for X includes a chlorine atom, a bromine atom and an iodine atom. Specific examples of the silylating agent are trimethylchlorosilane, triethylchlorosilane, tripropylchlorosilane, tributylchlorosilane, tripentylchlorosilane, trimethylbromosilane, triethylbromosilane, tripropylbromosilane, trimethyliodosilane, triethyliodosilane, and the like. Among these silylating agents, those compounds wherein X is a chlorine atom are preferred.

The oxygen permeability coefficient of the silylated polyphenylene ether is greatly influenced by the kind of the substituents, i.e., $R_5$, $R_6$ and $R_7$. The smaller the carbon atom number of each substituent, the greater the oxygen permeability coefficient of the silylated polyphenylene ether. For example, if at least one of the substituents is a phenyl group, the resulting silylated polyphenylene ether has a smaller oxygen permeability coefficient than that of the starting polyphenylene ether. Therefore, trimethylchlorosilane wherein all of $R_5$, $R_6$ and $R_7$ are methyl groups is the most preferred as a silylating agent.

The silylating agent is used in an amount sufficient to silylate all of the phenylene ether moiety to which the alkali metal has been added, more specifically, in an equimolar to slightly molar excess amount, e.g., 1.1 mole, per mole of the alkali metal adding agent used. The silylating reaction can be carried out at a temperature of from about $-80°$ C. to about $80°$ C., preferably from $-50°$ C. to $30°$ C.

The silylated polyphenylene ether is isolated from the reaction mixture usually by adding a nonsolvent for the polyphenylene ether, e.g., methanol, ethanol, propanol, n-hexane, n-heptane, n-octane, cyclohexane, cycloheptane, acetone, methyl ethyl ketone, methyl propyl ketone, etc., to the reaction mixture and separating the thus formed precipitate by filtration.

The degree of silylation and the silylated position of the thus obtained silylated polyphenylene ether can be determined usually by nuclear magnetic resonance absorption (NMR) spectrum.

The silylated polyphenylene ether is then formed in a ultra-thin membrane or coated on a porous thin support to obtain a membrane for separation of gas according to the present invention.

Production of a ultra-thin membrane can be carried ou, for example, by dissolving the silylated polyphenylene ether in a solvent and spreading the solution on a substrate such as a glass plate. Also, a membrane can be formed on a porous thin support, and coating of a thin film on the support is usually carried out by dissolving the silylated polyphenylene ether in a solvent which does not dissolve said support, and spreading, impregnating or coating the solution. Solvents which can be used for dissolution include benzene, toluene, xylene, chloroform and tetrahydrofuran. The porous thin support includes Japanese paper, nonwoven fabric, synthetic paper, filter paper, cloth, metal net, filter membrane, ultrafilter membrane, and the like, and may have various forms, such as a plane, a cylinder, a honeycomb cell, etc.

The membrane generally has a thickness of from about 30 to about 50 $\mu$m when no support is used. When the support is used, the thickness of silylated polyphenylene ether membrane on the support is generally in the range of from about 0.03 to about 0.1 $\mu$m, preferably 0.03 to 0.05 $\mu$m.

The membrane for gas separation in accordance with the present invention can be applied not only to production of an oxygen-rich air from air but also separation of methane and helium from natural gas, separation of carbon monoxide and hydrogen in a cracked gas and separation of any desired gas, such as oxygen, nitrogen, carbonic acid gas, carbon monoxide, hydrogen, argon, helium, methane, etc. from various mixed gases containing one or more of them.

The present invention will now be illustrated in greater detail with reference to examples and comparative examples. It should be understood, however, that these examples are not limiting the present invention.

EXAMPLE 1 AND COMPARATIVE EXAMPLE 1

In 1,000 ml of dried tetrahydrofuran was dissolved 10 g of a 2,6-dimethylphenol/2,3,6-trimethylphenol copolymer (molar ratio=95/5; [η]=0.53 dl/g at 25° C. in chloroform) in a dry nitrogen gas stream, and the solution was cooled to 0° C. n-Butyl lithium (a 15 wt % hexane solution available from Wako Pure Chemical Industries, Ltd.) was added to the solution in an amount of 0.5 molar equivalent (27 ml) per repeating unit of the copolymer, and the mixture was stirred at that temperature for 1.5 hours. Thereafter, 0.55 molar equivalent (6 ml) of trimethylchlorosilane (made by Tokyo Kasei Kogyo K.K.) was added per repeating unit of the copolymer, followed by stirring at 0° C. for 2 hours.

The reaction mixture was poured into methanol, and the precipitate thus formed was filtered, washed with methanol while stirring and filtered. The filter cake was dried at room temperature under reduced pressure for 20 hours to obtain trimethylsilylated polyphenylene ether.

The degree of substitution of the resulting silylated polyphenylene ether by a trimethylsilyl group was measured by NMR, and the results obtained are shown in Table 1.

A 2 wt % chloroform solution of the trimethysilylated polyphenylene ether was prepared and spread on a glass substrate to form a membrane having a thickness of about 30 μm as measured by the use of Permascope EC (made by Helmut Fischer GMBH).

The resulting membrane was measured for oxygen and nitrogen permeability coefficients according to a vacuum method by the use of a Seikaken-type gas transmission rate measuring system K-315 (made by Rika Seiki Kogyo K.K.) for measuring percent gas permeability, and the results obtained are shown in Table 1.

For comparison, the polyphenylene ether used as a starting material was shaped in a membrane and its permeability coefficients for oxygen and nitrogen were measured in the same manner as described above (Comparative Example 1). The results are also in Table 1.

EXAMPLE 2

The same procedure as described in Example 1 was repeated except for using 1.0 molar equivalent (53 ml) of n-butyl lithium and 1.1 molar equivalent (12 ml) of trimethylchlorosilane. The results obtained are shown in Table 1.

EXAMPLE 3

The same procedure as described in Example 1 was repeated except for using 1.5 molar equivalent (80 ml) of n-butyl lithium and 1.65 molar equivalent (18 ml) of trimethylchlorosilane to obtain a further silylated polyphenylene ether. The results obtained are shown in Table 1.

EXAMPLE 4 AND COMPARATIVE EXAMPLE 2

The same procedure as in Example 2 was repeated except for using poly(2,6-dimethyl-1,4-phenylene) ether ([η]=0.51 dl/g at 25° C. in chloroform) in place of the 2,6-dimethylphenol/2,3,6-trimethylphenol copolymer. The results obtained are shown in Table 1.

For comparison, the same poly(2,6-dimethyl-1,4)phenylene ether was shaped in a membrane in the same manner as in Example 2 (Comparative Example 2). The results obtained are shown in Table 1.

EXAMPLES 5 AND 6 AND COMPARATIVE EXAMPLE 3

The same procedure as in Example 2 was repeated except that 1.1 molar equivalent of triethylchlorosilane (made by Tokyo Kasei Kogyo K.K.) was used in place of trimethylchlorosilane and the reaction temperature for silylation was changed from 0° C. to 23° C. (Example 5) or 1.1 molar equivalent of t-butyldimethylchlorosilane (made by Tokyo Kasei Kogyo K.K.) was used in place of trimethylchlorosilane and the reaction temperature for silylation was changed from 0° C. to 23° C. (Example 6). The results obtained are shown in Table 1.

For comparison, the same procedure as in Example 2 was repeated except that a phenylsilylated polyphenylene ether prepared by using diphenylmethylchlorosilane instead of trimethylchlorosilane was used for film formation and the reaction temperature for silylation was changed from 0° C. to 23° C. (Comparative Example 3). The results obtained are shown in Table 1.

EXAMPLE 7

In 1,000 ml of dried tetrahydrofuran was dissolved 10 g of a 2,6-dimethylphenol/2,3,6-trimethylphenol copolymer (molar ratio=95/5; [η]=0.53 dl/g at 25° C. in chloroform) in a dry nitrogen gas stream, and 1.0 molar equivalent (53 ml) of n-butyl lithium (a 15 wt % hexane solution available from Wako Pure Chemical Industries, Ltd.) was added thereto per repeating unit of the copolymer. The reaction mixture was refluxed at 67° C. for 5 minutes, followed by allowing to cool to about 60° C., at which the refluxing stopped. Thereafter, 1.1 molar equivalent (12 ml) of trimethylchlorosilane (available from Tokyo Kasei Kogyo K.K.) was added to the reaction mixture per repeating unit of the copolymer. After allowing the reaction mixture to stand for 1 hour, the reaction mixture was treated in the same manner as in Example 1. The results obtained are shown in Table 1.

It can be seen from Table 1 that silylation at a high temperature results in a greater degree of silylation at the α-carbon atom of a polyphenylene ether than at the phenylene nucleus.

TABLE 1

| | Ex. 1 | Comp. Ex. 1 | Ex. 2 | Ex. 3 | Ex. 4 | Comp. Ex. 2 | Ex. 5 | Ex. 6 | Comp. Ex. 3 | Ex. 7 |
|---|---|---|---|---|---|---|---|---|---|---|
| Silylation | | | | | | | | | | |
| Substituent of Si* | Me$_3$ | | Me$_3$ | Me$_3$ | Me$_3$ | | Et$_3$ | Me$_2$, tBu | φ$_2$, Me | Me$_3$ |
| Amount of n-butyl lithium (molar equivalent per repeating unit) | 0.5 | | 1.0 | 1.5 | 1.0 | | 1.0 | 1.0 | 0.5 | 1.0 |
| Temperature (°C.) | 0 | | 0 | 0 | 0 | | 23 | 23 | 23 | 60 |
| Degree of Substitution (%) | | | | | | | | | | |
| α-Carbon atom | 10 | | 17 | 30 | 16 | | — | 17 | — | 38 |

TABLE 1-continued

|  | Ex. 1 | Comp. Ex. 1 | Ex. 2 | Ex. 3 | Ex. 4 | Comp. Ex. 2 | Ex. 5 | Ex. 6 | Comp. Ex. 3 | Ex. 7 |
|---|---|---|---|---|---|---|---|---|---|---|
| Phenylene nucleus Permeation Coefficient** | 15 |  | 32 | 39 | 32 | — | — | 0 | — | 12 |
| $PO_2 \times 10^{-10}$ | 39 | 11 | 88 | 140 | 86 | 11 | 29 | 29 | 6.7 | 32 |
| $PN_2 \times 10^{-10}$ | 11 | 2.4 | 25 | 42 | 25 | 2.3 | 8.5 | 8.3 | 2.1 | 9.5 |
| $PO_2/PN_2$ | 3.5 | 4.6 | 3.4 | 3.3 | 3.4 | 4.7 | 3.4 | 3.5 | 3.2 | 3.4 |

Note
*Me = methyl group; Et = tBu = ethyl group; t-butyl; ϕ = phenyl group
**gas permeation coefficient; unit: cc. (STP)·cm/cm² sec · cmHg

EXAMPLE 8

One drop of a 3 wt % trichloroethylene solution of the silylated polyphenylene ether obtained in Example 2 was dropped on the surface of water maintained at 10° C. The droplet of the solution spread on the water surface to form a round ultra-thin membrane. The resulting membrane was contacted with a polypropylene porous film having a thickness of 25 μm (Juraguard 2400, made by Polyplastics Corporation Limited) to prepare a composit membrane for gas separation. The ultra-thin membrane of silylated polyphenylene ether formed on the porous film support had a thickness of 0.1 μm. The resulting composit membrane had an oxygen permeation coefficient (PO$_2$) of $1.83 \times 10^{-4}$ cc (STP)/cm².sec.cmHg and a nitrogen permeation coefficient (PN$_2$) of $0.45 \times 10^{-4}$ cc (STP)/cm².sec.cmHg and a separation factor (PO$_2$/PN$_2$) of 4.0.

While the invention has been described in detail and with reference to specific embodiments thereof, it will be apparent to one skilled in the art that various changes and modifications can be made therein without departing from the spirit and scope thereof.

What is claimed is:

1. A membrane for gas separation which comprises a silylated polyphenylene ether having a constituting unit containing an organo-silane group represented by the formula (I):

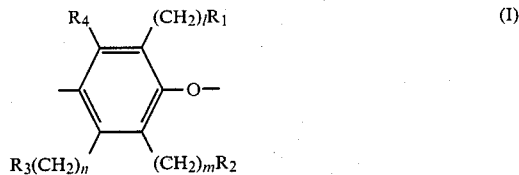

wherein $R_1$, $R_2$, $R_3$ and $R_4$ each represents a hydrogen atom or a group of the formula $-Si(R_5)(R_6)(R_7)$, wherein $R_5$, $R_6$, and $R_7$ each represents an alkyl group; l and n each represents 0 or an integer of from 1 to 3; and m represents an integer of from 1 to 3; with the proviso that $R_1$, $R_2$, $R_3$ and $R_4$ do not simultaneously represent hydrogen atoms, wherein the silylated polyphenylene ether is prepared by reacting a polyphenylene ether with from 0.3 to 3.0 molar equivalent of an alkali metal-adding agent per repeating unit of the polyphenylene ether, at a temperature of from about −80° C. to about 80° C., to form an alkali metal-added polyphenylene ether and reacting the resulting alkali metal-added polyphenylene ether with a slight molar excess of a monohalogenated silane per mole of the alkali metal-adding agent, at a temperature of from about −80° C. to about 80° C.

2. A membrane as claimed in claim 1, wherein $R_5$, $R_6$ and $R_7$ each represents an alkyl group having from 1 to 5 carbon atoms.

3. A membrane as claimed in claim 1, wherein the polyphenylene ether is poly(2,6-dimethyl-1,4-phenylene) ether or a 2,6-dimethylphenol/2,3,6-trimethylphenol copolymer.

4. A membrane as claimed in claim 1, wherein the alkali metal-adding agent is an alkyl lithium or an aryl lithium.

5. A membrane as claimed in claim 1, wherein the alkali metal-adding agent is used in an amount of from 0.5 to 2.0 molar equivalents per repeating unit of the polyphenylene ether.

6. A membrane as claimed in claim 1, wherein the reaction between the polyphenylene ether and the alkali metal-adding agent and the reaction between the alkali metal-added polyphenylene ether and the monohalogenated silane are carried out at a temperature of from −50° C. to 30° C.

7. A membrane as claimed in claim 1, wherein the monohalogenated silane is a chlorosilane.

8. A membrane as claimed as claim 1, wherein the monohalogenated silane is trimethylchlorosilane.

9. A membrane as claimed in claim 1, wherein said membrane comprising a silylated polyphenylene ether is supported by a thin porous support.

10. A membrane as claimed in claim 9, wherein said thin porous support is selected from the group consisting of Japanese paper, non-woven fabric, synthetic paper, filter paper, cloth, metal net, filter membrane and ultrafilter membrane.

11. A membrane as claimed in claim 9, wherein said membrane has thickness of about 0.03 to about 0.1 μm.

12. A membrane as claimed in claim 11, wherein said membrane has thickness of about 0.03 to about 0.05 μm.

13. A membrane as claimed in claim 1, wherein said membrane has a thickness of about 30 to 50 μm.

* * * * *